United States Patent Office 2,811,502
Patented Oct. 29, 1957

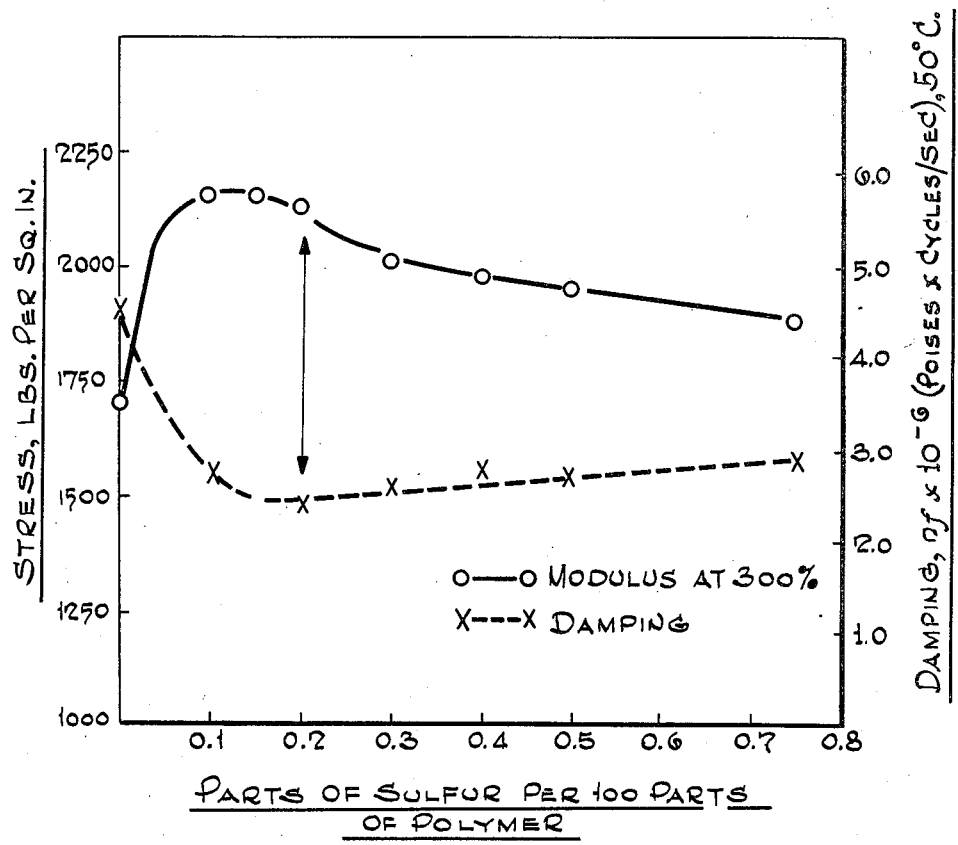

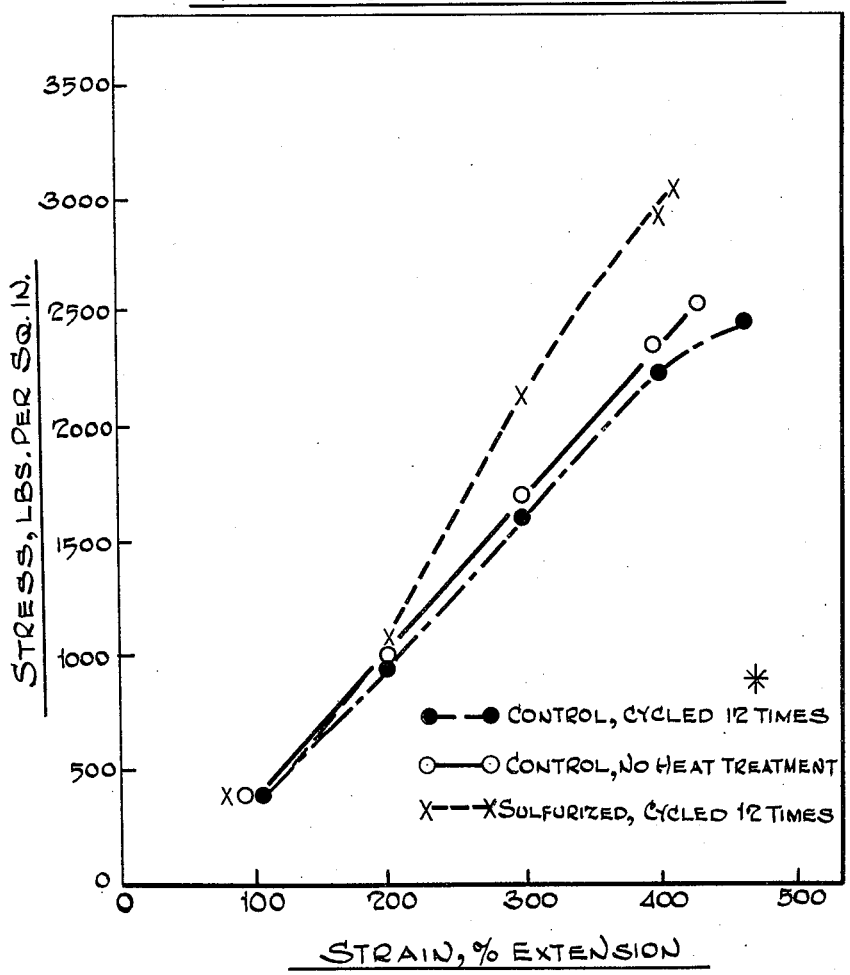

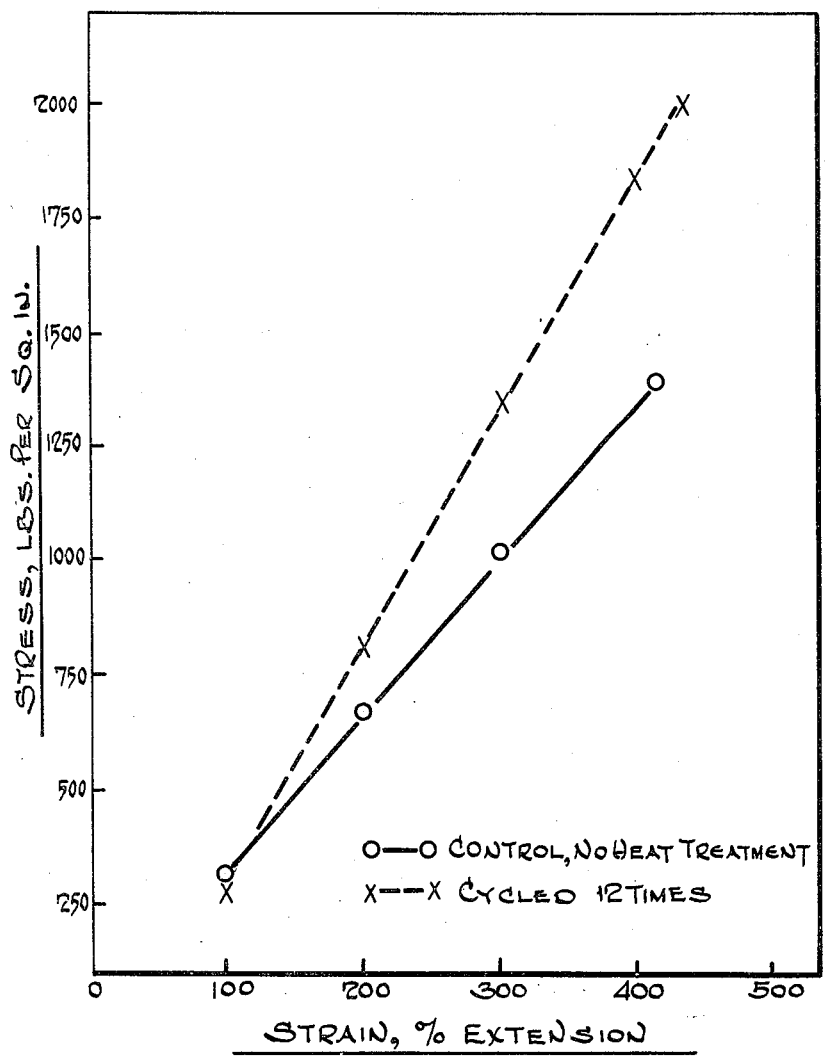

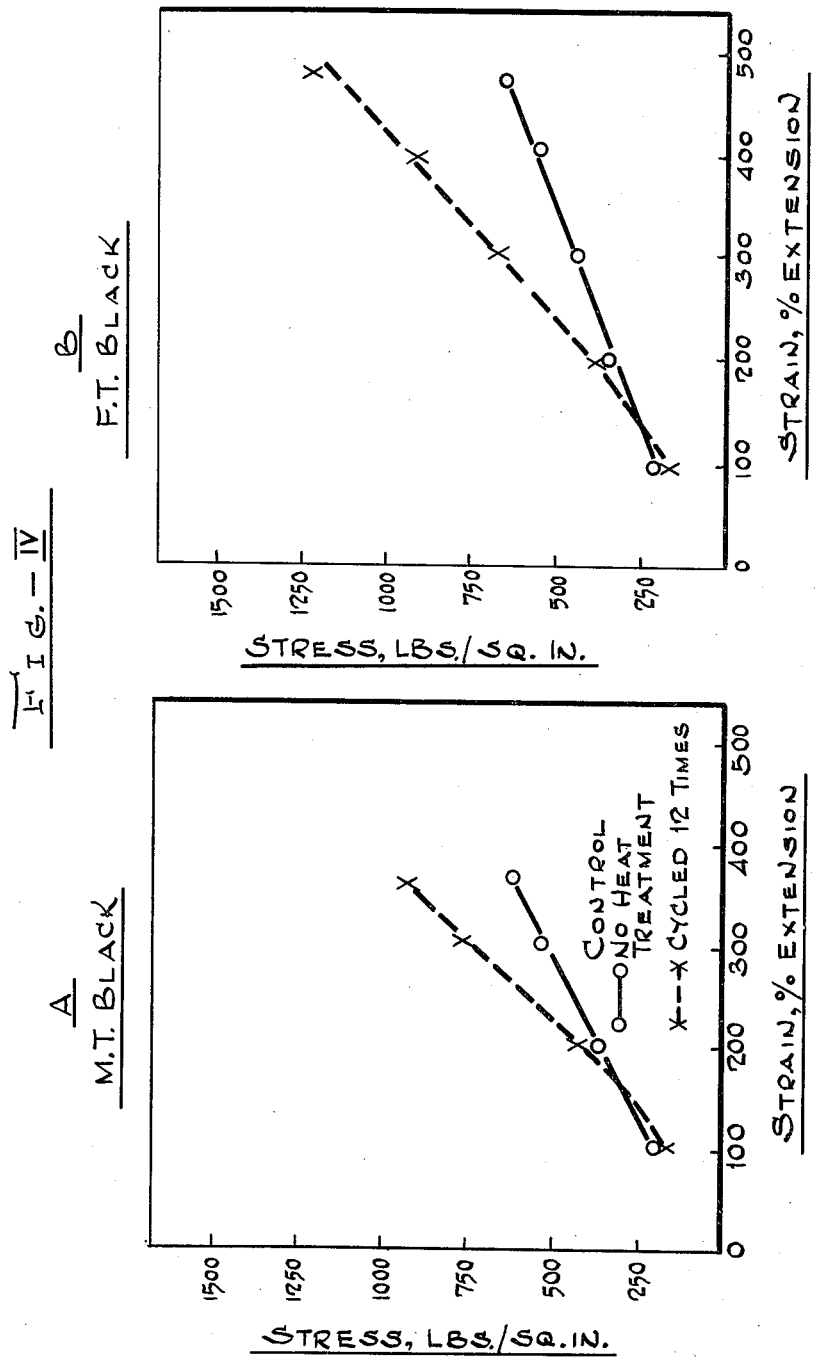

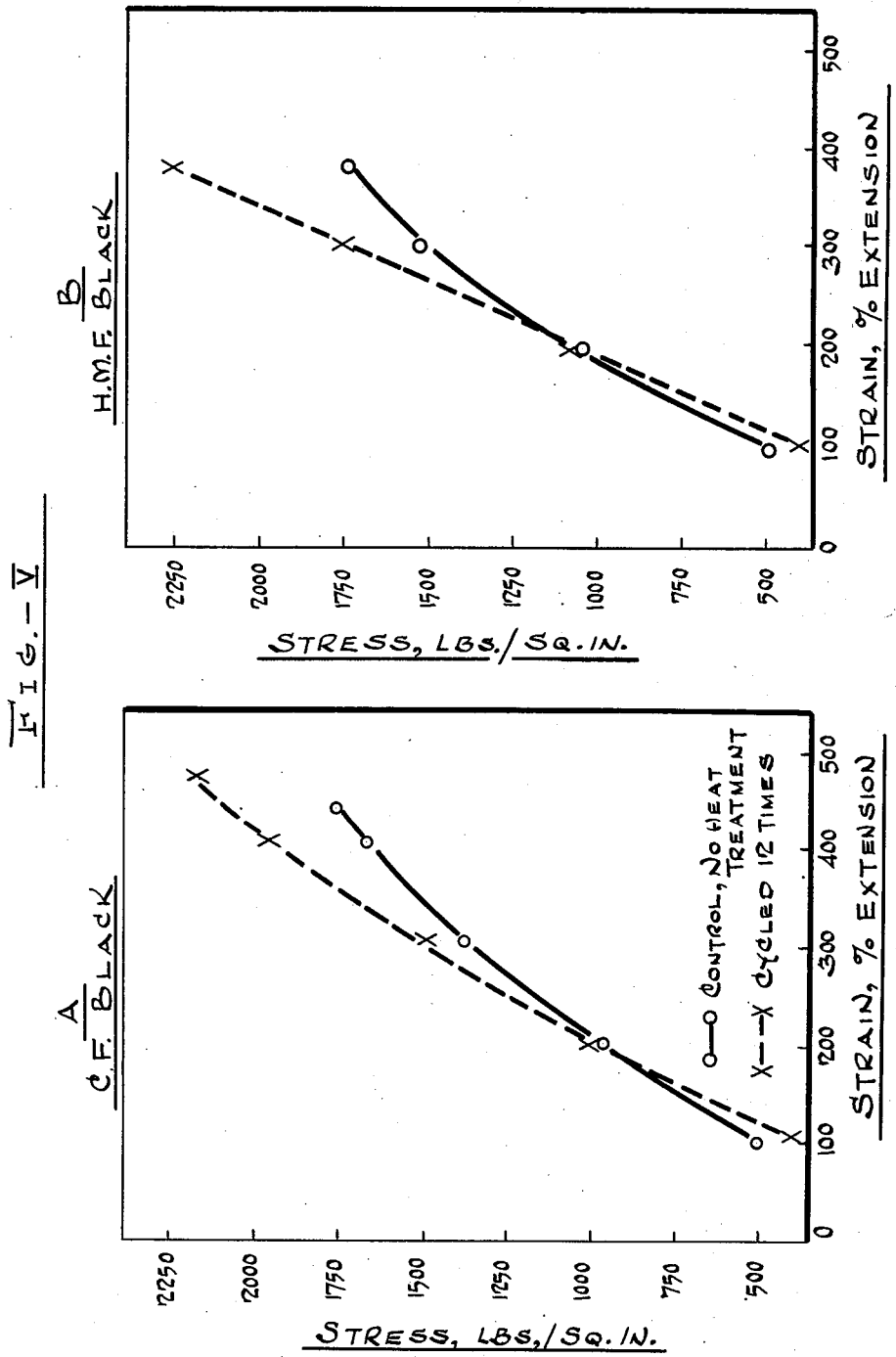

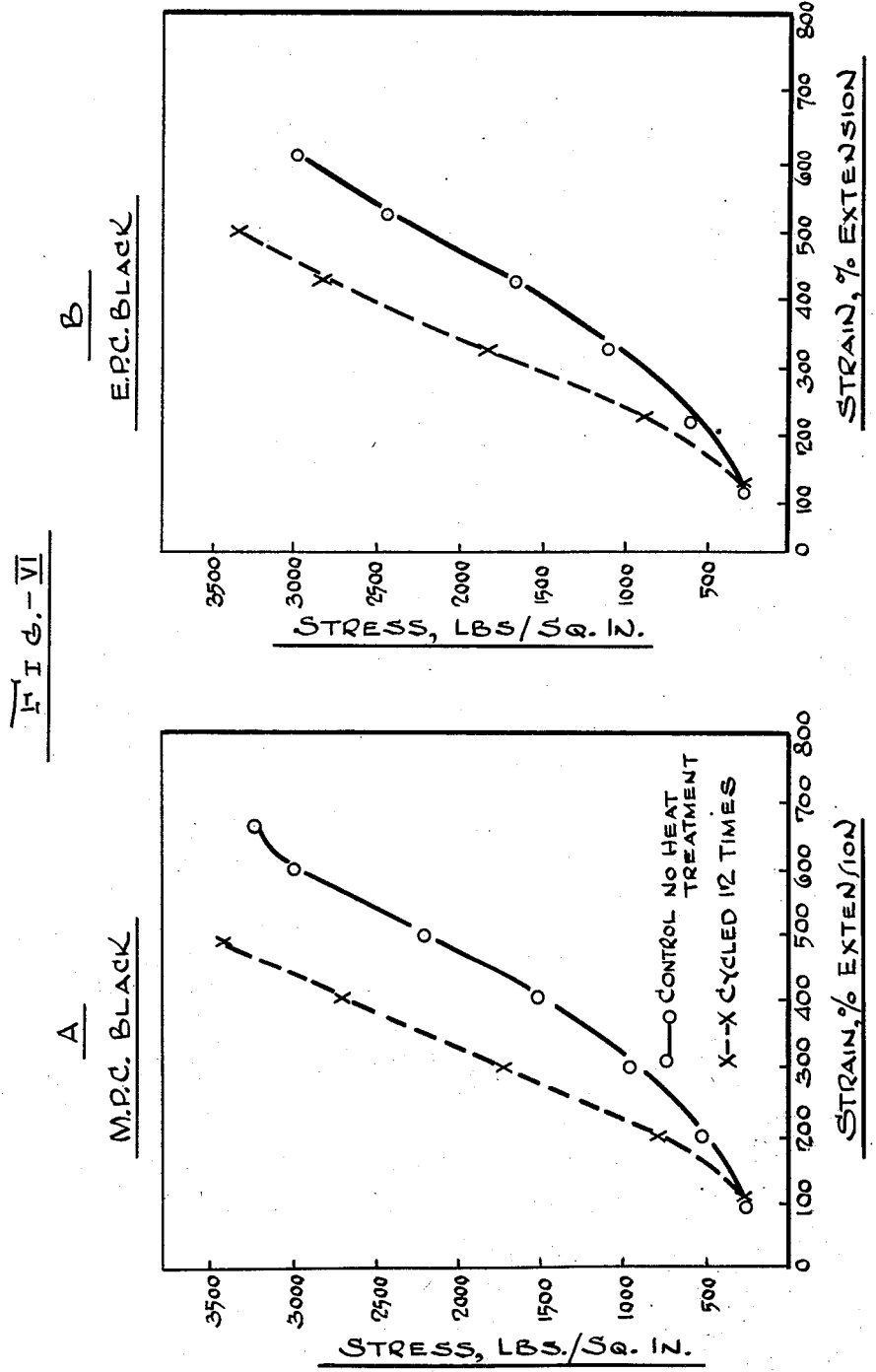

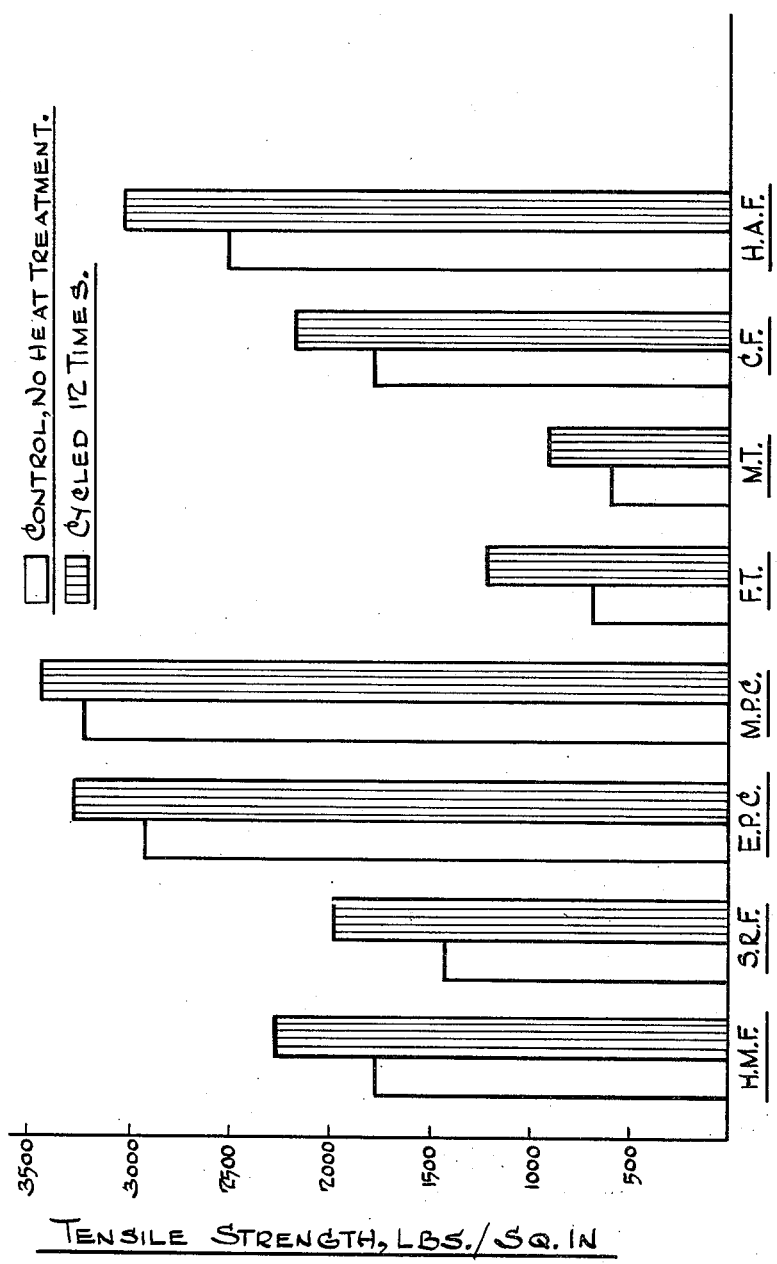

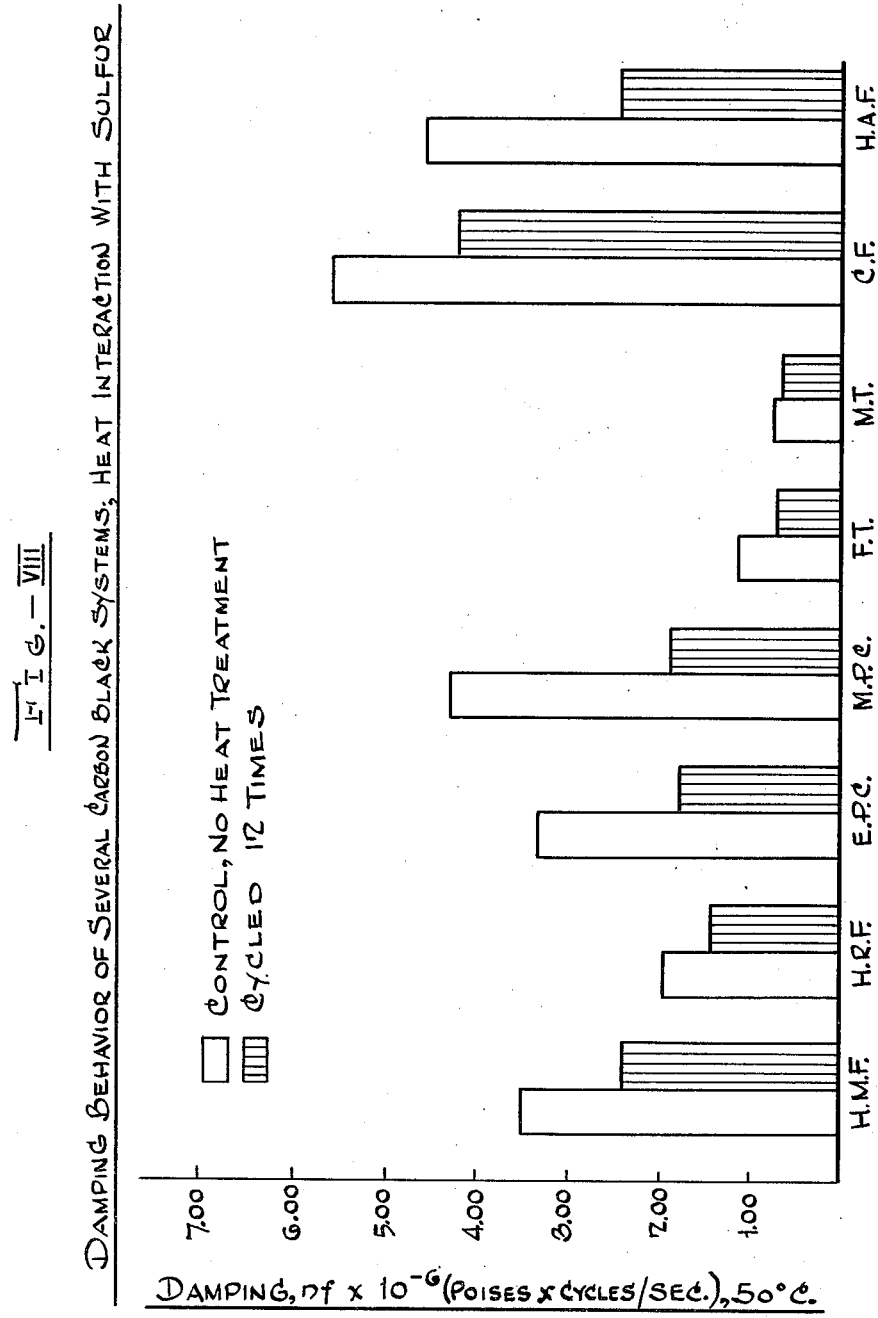

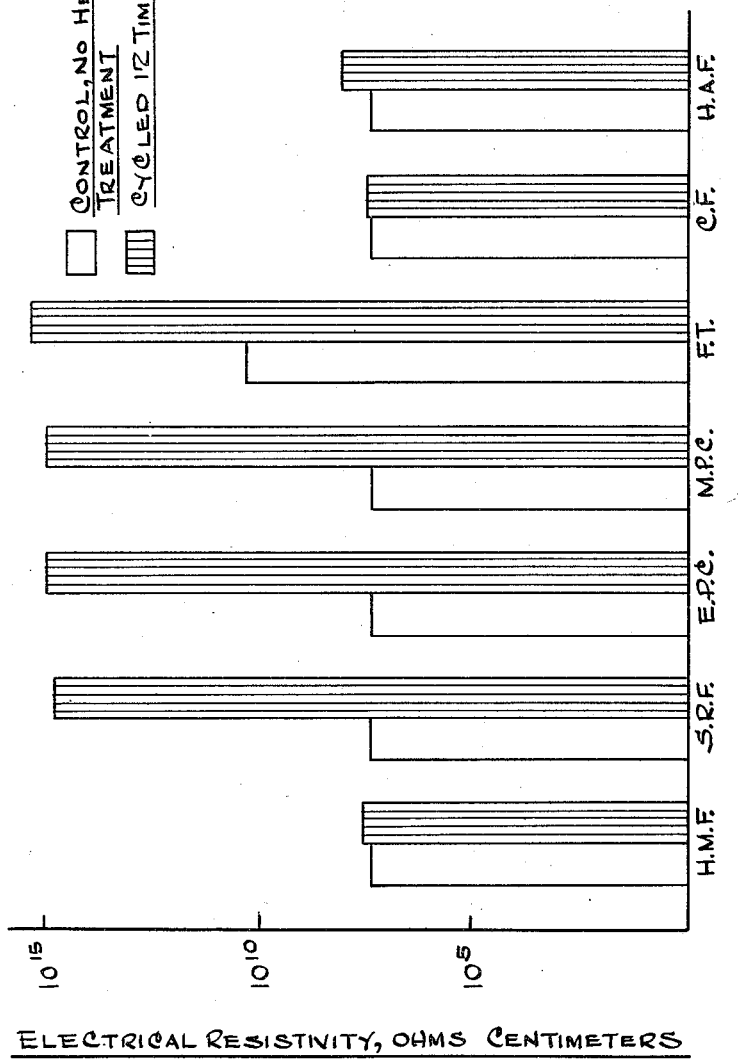

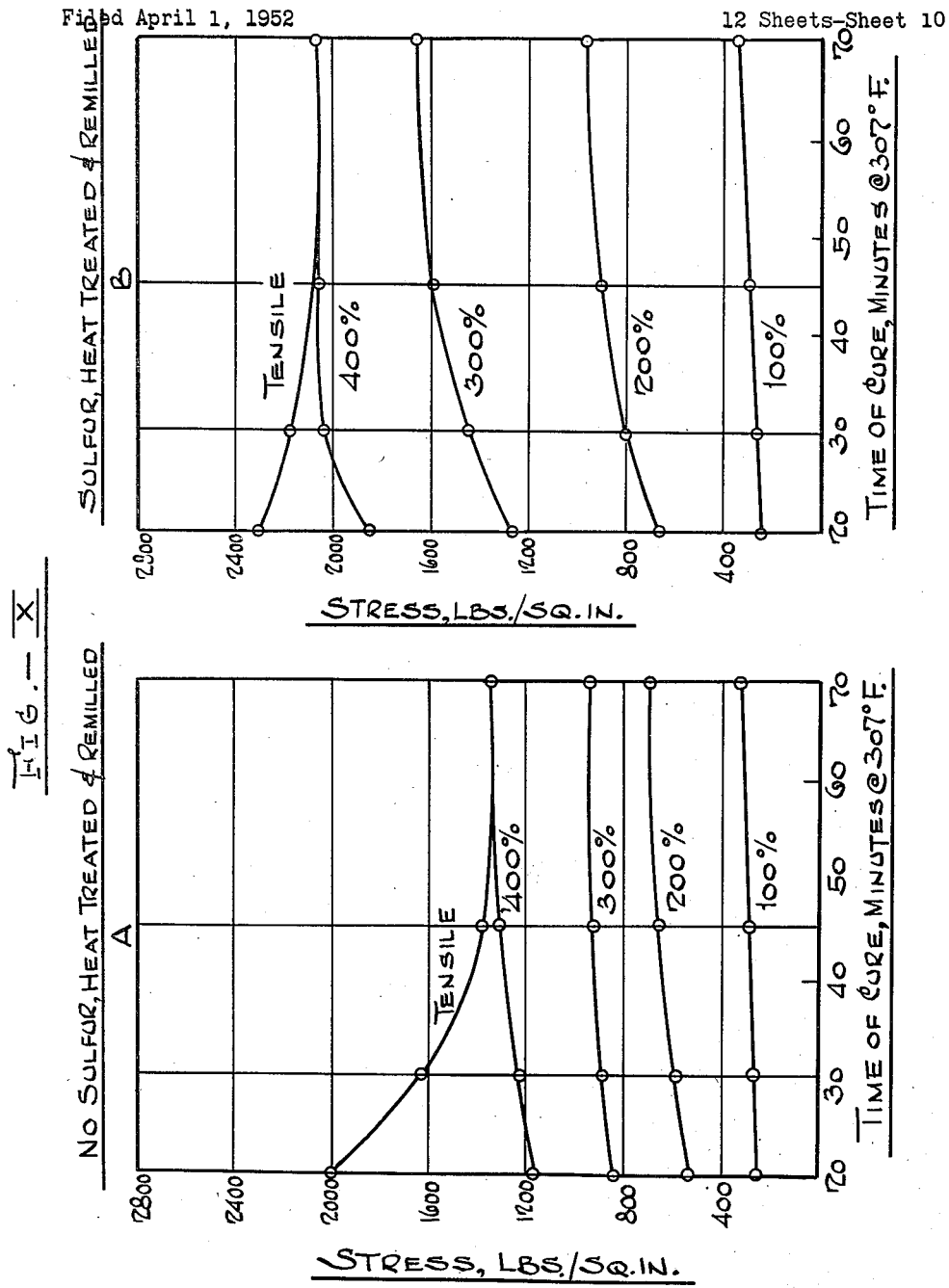

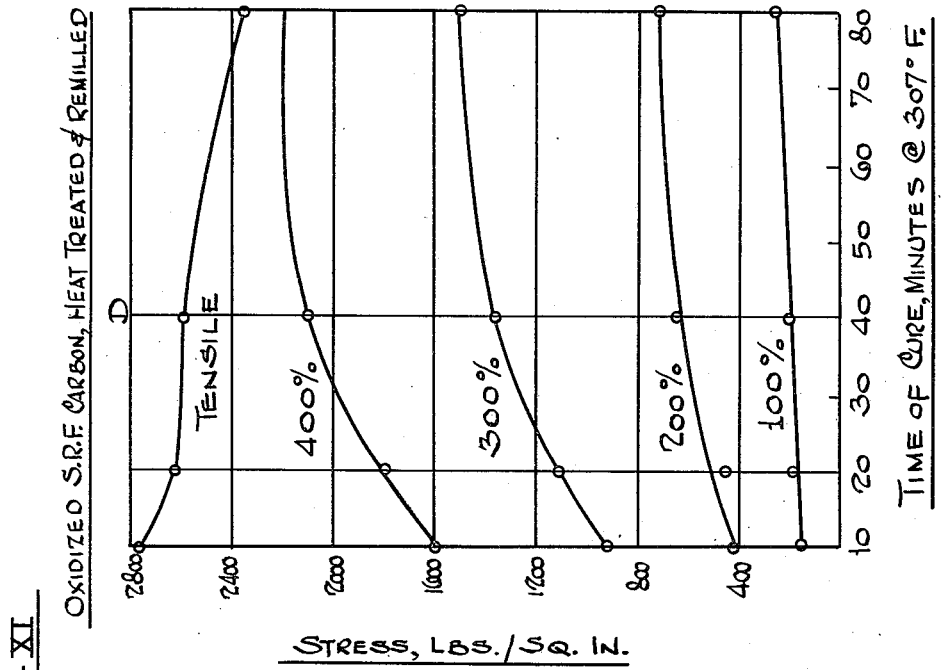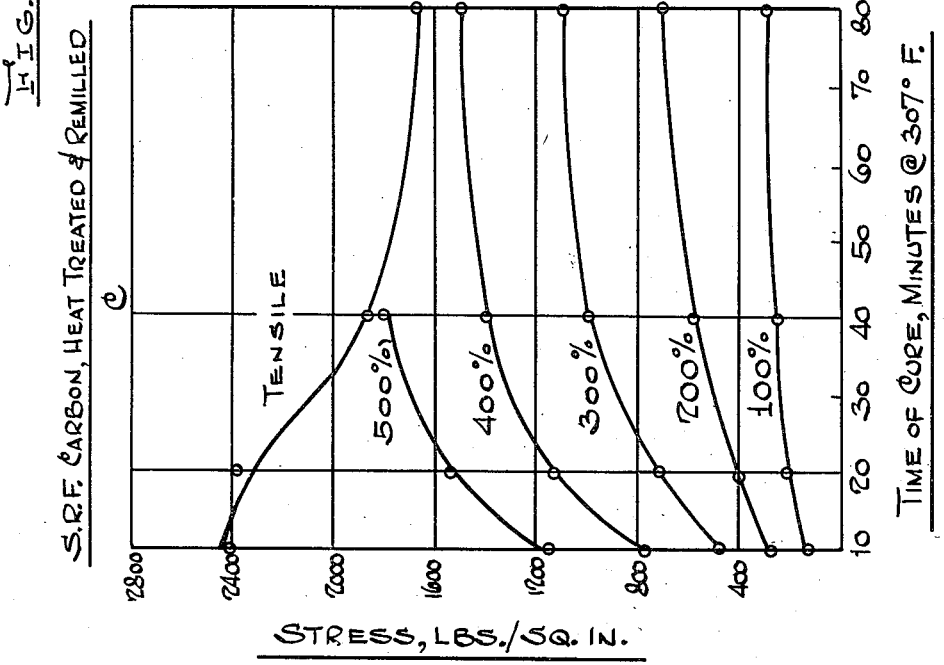

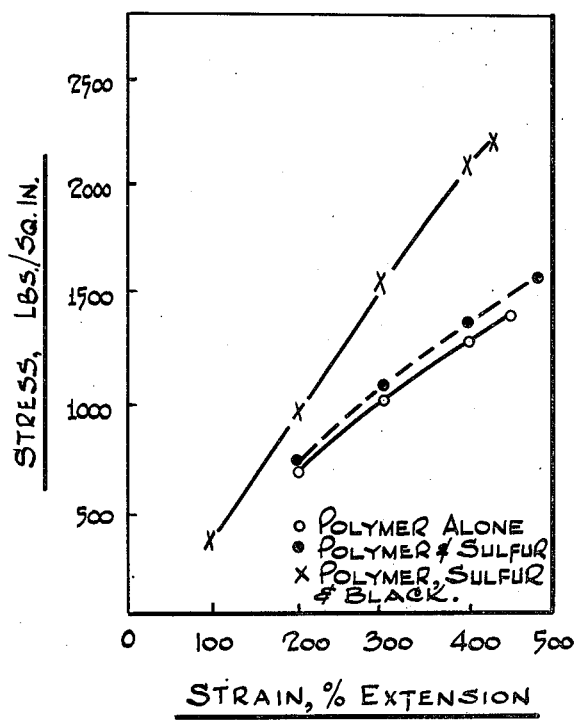

2,811,502

LOW HYSTERESIS PROCESSING OF BUTYL RUBBER

Albert M. Gessler, Cranford, and Samuel B. Robison, Westfield, N. J., assignors to Esso Research and Engineering Company, a corporation of Delaware Application April 1, 1952, Serial No. 279,762

13 Claims. (Cl. 260—41.5)

This invention is concerned with novel techniques for processing and compounding synthetic, rubbery olefin-multiolefin polymers and, more particularly, with novel methods for preparing such new rubbery polymer compositions having outstanding properties and to such compositions themselves.

A method for preparing polymer-carbon black compositions by the use of limited and critical amounts of sulfur and similar materials, under specified conditions of thermal interaction has been discovered. These novel compositions have greatly improved physical characteristics. The method generally is carried out by conducting a thermal treatment of the raw polymer either with or without simultaneous or subsequent agitation, such as by milling and mastication of mixtures of isoolefin-multiolefin copolymers with carbon black in the presence of a limited amount, usually not more than 1%, sulfur and preferably about 0.2% of sulfur. This treatment is not a vulcanization but is carried out prior to the addition of the curatives and thus represents a novel thermal pretreatment of the polymer-carbon black mixtures in the presence of limited amounts of sulfur prior to vulcanization.

It has been previously discovered and disclosed that a thermal interaction process can be carried out by the thermal treatment of raw polymer either with or without agitation with carbon black present, provided that the carbon black employed contains oxygen on its surface. When operating in this manner, it has been discovered that greatly improved products can be obtained from the commercial isoolefin-multiolefin rubbery copolymers, as described in U. S. 2,356,128.

It has been discovered that greatly improved products can be obtained by a novel thermal interaction process in which the carbon black and isoolefin-multiolefin polymer mixtures are subjected to heat treatment in the presence of small, limited amounts of at least one material selected from the sulfur family of elements, namely sulfur, selenium and tellurium, and chemical compounds, both organic and inorganic, containing these elements. Data are presented herein to show that this thermal interaction in the presence of the specified materials, yields products which have unexpected properties and which are particularly well adapted for commercial use. Furthermore, it will be shown that, for this invention, it is necessary to employ mixtures containing only limited amounts of the sulfur material, and that this process can be employed with good results for treating mixtures containing any kind or type of carbon black. It will also be shown by actual data that the process herein described for preparing the new compositions is an entirely different one from any which has been previously described. Data are also included to show that the process to which the mixtures are subjected gives a thermal interaction of an entirely different nature from that commonly known as "vulcanization."

Copolymers of isoolefin-multiolefin type have achieved great commercial importance especially in the manufacture of inner tubes, tire curing bags, wire insulation, and acid tank linings. The isoolefin-diolefin copolymers have a number of outstanding qualifications which include relative imperviousness to the passage of gases, high resistance to tearing, and high chemical resistance, especially to oxidative degradation, presumably because of the low chemical unsaturation of the copolymer.

The highly favorable qualities of the isoolefin-diolefin copolymers would appear to make these polymers ideally suited as materials for the production of tire casings. However, the vulcanizates of these copolymers, as heretofore produced, were characterized by a sluggishness and lack of elasticity or resiliency. The problem became more acute when reinforcing fillers, such as carbon black, were used. This lack of resiliency property has long been a serious handicap to the practical and large scale use of these copolymers as a tire rubber, although the other qualities of the copolymers make them appear especially desirable for use in fabricating tire casings. Tires previously prepared from isoolefin-diolefin copolymer compositions made under conventional process conditions showed high rolling resistance giving a heavy drag on the vehicle, and high abrasion wear, and were without advantages. Attempts to improve the resiliency properties by the addition of plasticizers to the copolymer compositions resulted in severe loss in tensile strength and modulus values, which rendered the materials undesirable for the production of tires.

Although it has been previously known that carbon black could be used in the compounding of isoolefin-multiolefin type polymers, as for instance, in U. S. 2,363,703, employing unusually large amounts of carbon black, this invention teaches to the art a completely practical and satisfactory process for preparing isoolefin-multiolefin compositions with carbon black whereby the finished compositions are not merely satisfactory but highly advantageous for tire casing formulations, particularly with respect to the resiliency properties.

The heat treatment or thermal interaction method described herein is employed to overcome the sluggishness and lack of resilience of these copolymer-carbon black compositions and to increase the toughness and "nerviness" of the copolymers. Although it is known that carbon black normally increases the already high internal viscosity of the isoolefin-multiolefin vulcanizates, the copolymer-carbon black systems which have been subjected to the herein disclosed heat treatment in the presence of a material from the sulfur family of elements, or a compound containing one of such elements, show a greatly reduced effect of the carbon black present on the internal viscosity of the copolymer. This process for improving the internal viscosity properties as well as stress-strain properties of the isoolefin-multiolefin copolymers is not limited to the use of any particular type of carbon black. It has been found that the heat treatment process is effective when carbon blacks of the channel, furnace and thermal types are used.

It is to be understood that the unusual and surprising effects which have been found to result from this improved thermal interaction method using materials selected from the sulfur family of elements are substantially limited to the synthetic isoolefin-multiolefin copolymers. They are, in fact, unique to these types of copolymers. Although some slight improvements in properties may be noted from the thermal treatment of natural rubber and other synthetic polymers in the presence of sulfur and such compounds, these treatments produce undesirable changes in other properties of the rubber and polymers and result in products having decreased usefulness. The extraordinary resistance properties of the isoolefin-multiolefin copolymers to either oxidative or mechanical breakdown assist in making them especially adaptable for improvement by the process of the present invention.

It has been known to produce a valuable interpolymer by reacting a low molecular weight olefin, preferably an isoolefin of 4 to 14 carbon atoms, such as isobutylene, with a low molecular weight multiolefin having from 4 to 14, inclusive, preferably 4 to 8, carbon atoms per molecule. Preferably this second component is a conjugated diolefin having from 4 to 8 carbon atoms per molecule such as isoprene, butadiene, hexadiene, dimethyl butadiene and piperylene, although other diolefins such as cyclopentadiene may also be used.

The polymerization reaction is carried out at a relatively low temperature, namely, below 0° C. and preferably below −50° C. and down as low as −164° C. in the presence of a suitable catalyst.

Suitable catalysts for use in carrying out the polymerization reaction are solutions of the known Friedel-Crafts polymerization agents. Thus, the active metal halides such as aluminum chloride, bromide, or iodide; or the uranium chlorides, titanium chloride, zirconium chloride, boron fluoride, stannic chloride, or the like can be employed. The catalyst is dissolved in a low freezing, inert solvent such as a lower alkyl halide or aliphatic hydrocarbon, or the like. Solvents which can be employed include methyl chloride, ethyl chloride, compounds of the "Freon" type such as dichlorodifluoromethane, and the like, low molecular weight, aliphatic hydrocarbons, such as butane, the pentanes, carbon disulfide, etc.

Other catalytic substances which can be used are Friedel-Crafts catalysts complexed with such reagents as olefins, ethers, alcohols, and the like, and oxychlorides, hydroxychlorides, and complex chlorides and bromides of metals of the Friedel-Crafts types, such as aluminum hydroxychloride, titanium hydroxychloride, zirconium hydroxychloride, aluminum bromo chloride, aluminum alcoholates, and hydroxylated aluminum halides. A particularly effective catalyst has been found in a solution of aluminum chloride in methyl chloride. If desired, catalyst promotors and modifiers may be employed to modify the action of the catalyst solution.

In preparing the isoolefin-multiolefin copolymer, the olefinic mixture is first prepared. The isoolefin is preferably present in the feed mixture in the proportion of from 80 to 99 parts by weight, although a proportion as low as 50 parts can be employed, particularly where butadiene is the multiolefin employed. The multiolefin, more particularly a diolefin having from 4 to 8 carbon atoms, is preferably used in a proportion of 20 parts to 1 part.

With butadiene, the mixture may contain from 50 to 90 parts by weight of isobutylene with from 50 to 10 parts of butadiene. With isoprene, the preferred range is from 95 to 99.5 parts of isobutylene with from 5 to 0.5 parts of isoprene. It should be noted that most of the multiolefins do not copolymerize into the polymer in exactly the proportion in which they are present in the mixture. With a butadiene and isobutylene mixture, approximately 30% of butadiene causes the copolymerization of only about 1% of the butadiene into the final copolymer. Most of the other unsaturated reactants show different polymerization ratios, isoprene having as near to a 1:1 polymerization ratio with isobutylene as any multiolefin so far studied.

This olefinic mixture may be polymerized alone, but it is preferably diluted with an inert diluent or diluent-refrigerant such as liquid ethylene, liquid ethane, liquid methane, liquid propane, liquid butane, liquid methyl or ethyl chlorides, or mixtures of these several inert diluent-refrigerants. These inert diluents can be present in the reaction mixture in the proportion of from 1 to 5 or more volumes per volume of the mixed olefinic reactants. Also, an excess of solid carbon dioxide can be used either with or without an excess of an auxiliary diluent-refrigerant. The preferred diluent-refrigerant is liquid ethylene which produces a temperature of from −98° to −103° C.

If desired, external cooling may be used. The polymerization reaction is carried out by circulating and/or agitating the cooled olefin-containing mixture with the catalyst solution. The reacting mixture may be circulated rapidly past cooling surfaces such as in a series of vertical or annular tubes submerged in a refrigerant. The catalyst solution is cooled and is applied to the mixture of olefins such as a fine spray or mist onto the surface or beneath the surface of the reacting mixture. The catalyst solution may also be introduced as a jet beneath the surface of the mixture. The catalyst should be rapidly mixed into and intimately dispersed throughout the entire body of the reacting mixture.

The amount of catalyst to be used is determined by the conversion level desired. In general, the desirable amount of catalyst is such as to yield an amount of polymer equal to from 10% up to 100% conversion of the isobutylene present, since the conversion level is usually expressed in terms of the amount of isobutylene. Preferably, the conversion limits are from 40% to 90% of the isobutylene.

The above description of the reactants, catalyst, solvents, and other details of the manufacture of the olefin-diolefin copolymer materials are well known in the art and need not be more fully set forth, but further details may be found in the many patents issued on the subject, especially U. S. 2,356,128.

When the desired amount of polymer has been produced, the reaction mixture containing the polymer is preferably dumped into warm water to bring the solid polymer product up to room temperature and vaporize out the residual materials from the polymerization step. The unreacted, recovered olefins and diluent can be suitably recovered and reused, if desired. Subsequently, the solid polymer is discharged as a slurry in water from which it is filtered, dried and milled for packaging, shipping and use. The catalyst may be inactivated while the mixture is still cold with such agents as alcohols, ethers, ketones, amines, and ammonia. Suitable recovery procedures are known as disclosed in, for example, U. S. 2,463,866.

It is also possible to carry out the polymerization of isoolefin-multiolefin mixtures in a solution type process in which the catalyst and reactants are in solution throughout the entire period of the process. Although this type of operation requires certain engineering modifications, it can be carried out along the same general lines as those above described. This polymerization process yields isobutylene-diolefin copolymers having an average Staudinger molecular weight number within the range between about 20,000 and 200,000 and a Wijs iodine number of from about 1 up to 50. The correspondingly related 8-minute Mooney viscosity values of the copolymers should be at least 15 and may be higher up to 60 or even up to 160 or to the limit of the Mooney viscosity testing equipment. Polymers having extremely low molecular weights either do not cure at all or cure too poorly to be commercially useful, and polymers having molecular weights which are too high can become so tough and leathery that they are extremely difficult or impossible to process on the mill. The exact range of molecular weights obtained depends in part upon the temperature, in part upon the catalyst, in part upon the precise proportions of isobutylene and multiolefin used, and on the known control features. Any of these various isoolefin-diolefin copolymers can be successfully employed to carry out the process of this invention and to prepare the novel compositions herein described. Although the final products may vary somewhat with the precise polymer employed, it is not intended to limit the usable copolymers in any way to those specifically described but merely to show representative and typical kinds of copolymers which can be used. But it is to be understood that the great benefits obtained in improved properties are peculiar to the treatment of isoolefin-multiolefin copolymers of low unsaturation.

This invention broadly contemplates the heating of isoolefin-multiolefin copolymers, carbon black, and not more than 1% of sulfur, preferably at least 0.1% or its equivalent of an element selected from the sulfur family, namely, sulfur, selenium and tellurium, or a chemical compound containing sulfur or such equivalent. The heating of such a mixture effects a thermal interaction between the copolymer and the surface of the carbon black. This thermal interaction involves the sulfur component chemically and requires its presence within the mixture during the reaction. It is also necessary that the carbon black be present together with the sulfur material, at the time the heating takes place. The heating may be either with or without simultaneous, subsequent, or intermittent agitation such as milling or mastication and the time of such treatment will vary somewhat with temperature, agitation conditions, and the amount of sulfur, sulfur-containing compound, or an equivalent material present.

The milling or mastication alone without heating of the copolymer, carbon black and sulfur mixture does not give the enhancement of the physical properties which is obtained by the thermal interaction treatment. In other words, at room temperatures and low temperatures, generally the beneficial effects are obtained too slowly to be practical, if any thermal interaction occurs at all. On the other hand, the heating of the copolymer, carbon black, sulfur-containing mixtures without mechanical agitation gives some beneficial results but the effects are somewhat less than those obtained when the combined heat treating and agitation process is used. Optimum conditions of temperature and agitation seem to exist for different sulfur concentrations, and for various sulfur-containing materials and their equivalents.

To carry out the process of the invention, a mixture of isoolefin-multiolefin copolymer, carbon black and sulfur in a concentration not greater than 1% based on the amount of copolymer, are subjected to heating for a period of time. There is a definite relationship between the concentration of sulfur used, the time of heating, the temperature to which the mixture is being subjected, and the degree of improvement in physical properties gained. In general, the heat treatment without mechanical agitation of the mixture can be carried out in a heating vessel for a period of from about ½ to 7 hours at a temperature ranging from about 250 to 450° F. Exposing the mixtures to a heating in open steam under static conditions can be satisfactorily employed. Optimum results can be obtained for isobutylene-isoprene copolymer by heat treating the mixture in the presence of about 0.2% sulfur for about 5 hours at 320° F. For large scale operations, shorter time periods are generally preferred.

Another method in which this novel process can be carried out is by heat treating the copolymer, carbon black and sulfur mixture while subjecting it to mechanical agitation as in a Banbury mixer or on a rubber mill. For best results, in using the Banbury mixer, the copolymer, carbon black, and sulfur mixture is generally heated at a temperature of from about 250 to 450° F. for about 10 to 60 minutes. Preferred conditions are heating and agitating at about 380° to 400° F. for about 30 minutes. There is also a time-temperature relationship for the thermal interaction process when the heating is combined with simultaneous agitation. In general, the higher the temperature, the shorter the time required to reach the same level of improved results.

The improvements of the invention can also be achieved by alternate heating and mechanical agitation treatment of the copolymer, carbon black and sulfur mixture. These heating and agitation steps are conveniently carried out in cycles. The stationary heating step can be done in an oven or other heating vessel at a temperature of 250 to 450° F. for periods of 15 to 60 minutes followed by a period of agitation, for example, on a mill at 80 to 90° F. for a time of from 2 to 10 minutes. These alternate heating and agitation steps can be repeated as many times as is desired or is convenient with some improvement being realized in each cycle. From 2 to 12 cycles may be conveniently employed. Commercial expediency prevents having more than about 12 cycles.

It is not intended to limit the process of thermal interaction or heat treatment of isoolefin-multiolefin copolymers, carbon black and sulfur-containing mixtures to these particular methods since various other procedures and combinations of heating and agitation may be employed to achieve essentially the same results.

In the various procedures above described, improvements in tensile strength, modulus, internal viscosity and carbon black particle dispersion for all types of carbon black including channel, furnace and thermal blacks are obtained. These improvements are indicated by the data of the examples shown below.

The type of carbon black suitable for the process and the amount thereof to be admixed with the isoolefin-multiolefin copolymers, thereafter to be subjected to this thermal treatment in the presence of sulfur may be varied widely. Both reinforcing carbon blacks such as channel blacks, and the furnace blacks, as well as the non-reinforcing carbon blacks such as thermal blacks, may be employed. The amount of such carbon black which can be used may range from 20 parts by weight up to 200 parts by weight based on an amount of 100 parts by weight of copolymer. About 50 parts by weight of carbon black per 100 parts of copolymer is believed to be an optimum amount for producing the best products for many purposes.

It is intended for the process and compositions of this invention that any of the channel blacks such as EPC, MPC, HPC, and CC can be used, these letters denoting carbon black products well known to the trade. Furnace blacks including SRF, HMF, CF, FF and HAF carbon blacks can be quite satisfactorily used. Thermal blacks can also be employed.

It is also intended that for the process and compositions of this invention any of the materials of the sulfur family of elements can be employed, as well as reactive compounds both of the organic and inorganic types, containing these elements. By "sulfur family of elements" it is intended to include, for the purposes of this invention, the elements sulfur, selenium and tellurium. Both organic compounds containing these elements such as tetramethylthiuram disulfide, mercaptobenzothiazole, 2,2-benzothiazyl disulfide and other sulfur-containing organic compounds of the aliphatic, alicyclic, aromatic and heterocyclic types, as well as salts and other derivatives can be employed. Inorganic materials including phosphorus and antimony sulfides, selenides and tellurides can also be used. These sulfur containing materials must be of the type to yield relative sulfur or the other reactive element at the temperature of the treatment. From a commercial view, it is generally preferred to employ elemental sulfur since it is readily available, compatible with the other components, and its concentration can be easily controlled to give the precise effect desired.

If desired, these heat treated polymer-carbon black products may be modified by mixing therewith substantial amounts of mineral fillers, pigments, etc., such as pulverized clays, limestone dust, pulverized silica, diatomaceous earth, iron oxide, additional carbon black, and the like. Although these materials may be admixed prior to the heat treatment but preferably thereafter and may be used either in small amounts such as 1/10% or 1% or 5% or so, or in large amounts, for instance, 5% to 20% or 30% to 60% or more as is known in the compounding art. Also, it may be desirable to incorporate a substantial amount of a plasticizer or softener, such as paraffin wax, petrolatum, viscous mineral lubricating oil, a petroleum oil, or a small amount of relatively non-volatile organic compound such as dibutyl phthalate, or dioctyl phthalate with the heat treated copolymer-carbon black composition. Also, other substances may be added, such as dyes and anti-oxidants, if desired.

The copolymer composition after the present heat treatment can be combined with curing agents, especially sulfur plasticizers and the like, and suitable sulfurization aids such as "Tuads" (tetramethylthiuram disulfide), or "Captax" (mercaptobenzothiazole), or "Altax" (2,2'-benzothiazyl disulfide) in the usual manner for vulcanization purposes. Non-sulfur curing agents may also be used. The polymer, when so compounded, is cured into an elastic, rubber-like substance by the application of heat within a temperature range of 275 to 395° F. for a time interval ranging from 15 to 120 minutes in the usual way.

The pretreated products of the above described methods in the presence of critical amounts of sulfur are believed to be new compositions, and are completely different from products obtained by the well-known vulcanization reaction. The data clearly show that these novel products have undergone an interaction involving all three of the components, namely, the copolymer, the carbon black and the sulfur. Furthermore, this interaction takes place in the presence of critical concentrations of sulfur and at critical temperature ranges. Too small an amount of sulfur does not give an adequate treatment to condition the copolymer, while on the other hand, too great an amount of sulfur results in a breakdown releasing hydrogen sulfide and thereby producing an inferior "reclaimed rubber" product. Although isoolefin-multiolefin and carbon black compositions have been widely used as inner tube stocks and for various other purposes, they have been unsatisfactory for abrasion-resistant purposes as exemplified by tire tread stocks. This deficiency is well known in the art and its solution as exemplified by the instant invention is an outstanding feature of the new compositions. These mixtures differ from the older mixtures, and are characterized by increased tensile strength, increased resilience, and lower heat build-up during flexure and due to the vibration.

The compositions, to superficial observers, are similar to the known mixtures except that they appear softer; but in their use and on subjection to suitable tests, their differences are striking.

Although it is not intended to limit the invention to any particular physical or chemical theory, it is suggested from studies of the data obtained as an explanation for the results given by this process, that an actual interaction takes place between the surface of the carbon black particles and the copolymer molecules through an intermediate sulfur bond during the heat period. Such an effect is indicated from the known factors concerning the presence of "bound" copolymer. The expression "bound" copolymer is used to characterize the portion of the copolymer in the copolymer-carbon black mixture which is insoluble when solution experiments are conducted on the unvulcanized mixture. It is thus suggested that there is a kind of sulfur bridge or chemical bond formed between the carbon black surface and the copolymer chain. The formation of this sulfur bond or bridge occurs during the heat treatment of the mixture and its formation is assisted by agitation of the mass, such as by milling or mastication. Likewise, during the heat treatment and agitation period, greater dispersion of the carbon particles takes place and the discreet carbon particles can act as individual bridges between the molecular chains and not as large, irregular agglomerates. This allows a greater degree of orientation of the polymer chains and contributes both to greater strength and reduced internal viscosity. It has also been shown that the ability of the polymer chains to orient within the mass, and consequently the internal viscosity, is related to the abrasion resistance of the ultimate cured vulcanizate. "Bound" rubber is known in natural rubber compositions but this appears to differ from the type of bound rubber referred to herein which is permanent. The expression "bound" rubber noted in the literature on natural rubber reverts, on working, to a soluble type material.

From what has been said before as to the treating process, it will be understood that various copolymers of the olefin-diolefin type, and especially those having molecular weights of from 20,000 to 200,000 and iodine numbers below 50, such materials having been collectively known under the general term of "GR-I," are applicable to this process. It may be desirable to describe more specifically the treated or reacted products which are believed to be new and to mark this definite forward step in rubber technology. These treated compounds are true chemical combinations since the heat treatment effects a bonding reaction between the carbon, the copolymer and the sulfur which was heretofore unknown. The bond is undoubtedly through a sulfur bridge.

What has been said above is particularly applicable to unvulcanized, heat pretreated copolymer-sulfur-carbon black compositions, but the vulcanized products are equally new whether the vulcanization is effected by the ordinary sulfur cures or the well-known non-sulfur cures carried out by the use of the quinone dioximes, or dinitrosobenzene, and their equivalents. In both instances, it will be noted that the pretreatment in the presence of sulfur has effected a chemical combination between the black and the copolymer through a sulfur bond which combination is then vulcanized in the manner hitherto known.

The present products have been especially indicated as tire tread and tire casing materials, since such use has not heretofore been made of GR-I polymers. Such polymers have long been thought useless for that purpose. The present invention, therefore, extends the applicability of these polymers to an entire range of usefulness which has previously been reserved for natural rubber alone. Thus, these products can be used successfully for many other purposes, for example, for inner tube stocks, electrical insulation, lining for tanks, for rolls, for furniture, upholstery and bedding, elastic pads, shoe soles, waterproof fabrics, and the like. In all these instances, the treated copolymer not only possesses the improved qualities added to the pretreatment but also retains the high chemical resistance of the original untreated copolymers.

The following examples are presented to illustrate the process but it is not intended that the invention be specifically limited thereto.

EXAMPLE 1

*Effect of sulfur concentration*

A series of experiments was made to study the effect of concentration of sulfur when employed in heat interaction of carbon black and isobutylene-isoprene copolymers. The compositions so prepared are shown in Table 1.

TABLE 1.—COMPOUNDS FOR SULFUR CONCENTRATION EXPERIMENT

| Sample No | 1 | 2 | 3 | 4 | 5 | 6 | 7 | 8 | |
|---|---|---|---|---|---|---|---|---|---|
| Isobutylene-isoprene copolymer | 100.0 | 100.0 | 100.0 | 100.0 | 100.0 | 100.0 | 100.0 | 100.0 | Portions for Thermal Interaction. |
| HAF Carbon Black | 50.0 | 50.0 | 50.0 | 50.0 | 50.0 | 50.0 | 50.0 | 50.0 | |
| Stearic Acid | 0.5 | 0.5 | 0.5 | 0.5 | 0.5 | 0.5 | 0.5 | 0.5 | |
| Sulfur | 0.1 | 0.15 | 0.2 | 0.3 | 0.4 | 0.5 | 0.75 | | |
| Zinc Oxide | 5.0 | 5.0 | 5.0 | 5.0 | 5.0 | 5.0 | 5.0 | 5.0 | |
| Sulfur | 2.0 | 2.0 | 2.0 | 2.0 | 2.0 | 2.0 | 2.0 | 2.0 | Portions for Curing. |
| Tetramethylthiuram disulfide | 1.0 | 1.0 | 1.0 | 1.0 | 1.0 | 1.0 | 1.0 | 1.0 | |
| 2,2'-benzothiazyl disulfide | 1.0 | 1.0 | 1.0 | 1.0 | 1.0 | 1.0 | 1.0 | 1.0 | |

An HAF carbon black (furnace carbon black) was employed. Eight samples were prepared using the indicated portions for thermal interaction. The rubbery copolymer used here was made according to U. S. Patent 2,356,128, using about 97% isobutylene, and 3% of isoprene as polymerization feed; this rubber had a 60-70 Mooney value and an iodine number (Wijs) of about 10.0. All these samples were subjected to a heat interaction in the presence of sulfur in varying amounts as shown, except sample No. 8. The indicated mixtures of copolymer, carbon black, and stearic acid were mixed in a Banbury mixer. The sulfur in each case was added to the samples during 5 minutes milling on a cold (80°–90° F.) 6" x 12" laboratory mill. The heat treating and remilling procedure was then performed on just the copolymer-carbon black mixtures containing sulfur with the other vulcanizing agents not present. This heat treatment consisted of repeated heatings in steam for ½ hours at 330° F. followed by 5 minute milling period at 0.035" mill setting. Twelve such cycles were carried out. The stocks become smoother and softer and the cut surfaces are shiny black rather than dull grey-black.

After the above mixing procedures were completed, the indicated vulcanizing agents were added and the samples were vulcanized for 45 minutes at 307° F.

The dynamic behavior of the vulcanized samples 1 through 8 was studied by the free vibration in compression of a cylindrical pellet in a weighed pendulum apparatus frequently referred to as the Yerzley oscillograph. The damping or hysteresis effect is expressed as a product of internal viscosity and frequency since in free vibration systems the frequency cannot be controlled at a constant value. The absolute damping effect or the work of compression that is absorbed as heat is related to frequency and internal viscosity by the following equation:

$$\text{Absolute damping} = W\eta = 2\pi^2 f \eta A M^2 / h$$

where $f$ = frequency
$\eta$ = internal viscosity
$M$ = amplitude
$A$ = cross sectional area of pellet
$h$ = height of pellet M, the amplitude, is controlled by the amount of weights added to the pendulum, A and h are dimensional constants so $\eta f$ is directly related to the energy loss upon vibration. The damping term, $\eta f$, is directly proportional to the internal viscosity and inversely proportional to the elasticity or resilience of the vulcanized sample.

Measurements of this $\eta f$ function were made at 50° C. on samples 1 through 8. These measurements are tabulated in Table 2 and are plotted in Figure I against the amount of sulfur present in the heat-mill cycled portions.

Stress data were also determined on the vulcanized samples 1 through 8. These data are also shown in Table 2. The stress properties of samples 1 through 8 are also plotted in Figure I against the amount of sulfur present during the heat interaction process.

The curves plotted in Figure I show a number of effects.

Stress in the vulcanizates increases sharply as sulfur is added to the heat interaction portions. It reaches a maximum value at about 0.15 part of sulfur under this particular set of conditions. This effect is shown by the upper curve of Figure I. As the concentration of sulfur is taken beyond 0.2 part, the modulus falls off, rapidly at first, and then linearly after about 0.3% of sulfur. The changes in stress behavior are paralleled by changes in vulcanizate elasticity. Damping is reduced when sulfur is added in the heat interacted batch and reaches its minimum value at 0.2 part. Addition of more sulfur results in increased hysteresis, as is shown by the lower curve in Figure I.

The indicated decrease in optimum vulcanizate quality as the concentration of sulfur is taken beyond 0.2 part in the thermally reacted batch is significant. One explanation may be as follows:

With 0.3 part or more of sulfur in the thermal interaction system there is a tendency for polymer-polymer cross linking. The batches appear tough and elastic after the first heating. There is evidence that some slight cure is taking place. The trend becomes more pronounced the higher the concentration of sulfur. On subsequent milling, the polymer-polymer cross links are broken. Hydrogen sulfide gas is evolved and the masses become progressively softer. The same pattern of behavior is observed in the second cycle and, to a diminishing extent, up through 4 to 6 cycles. It thus appears that some slight degree of normal cure is taking place along with the desirable reaction during the first several heats and that the resulting vulcanizates are being reclaimed as the heat-mill cycling is extended. Reclaimed rubber is inferior to fresh rubber, a fact which accounts for the quality decay shown in Figure I.

If carbon and polymer are bound chemically through sulfur, the reaction must operate in competition with legitimate vulcanization. The latter appears to be supressed when no accelerators are present and the concentration of sulfur is extremely low, 0.2 part or less per 100 parts of polymer. In this range the action is preferential toward the black. As the concentration of sulfur is increased, polymer-polymer cross linking becomes more dominant. An excess of sulfur is used in normal vulcanization and under this condition, with organic accelerators as promoters, polymer-polymer bonds are formed very rapidly. The system is thus immobilized quickly with the result that little chance is left for continued carbon-polymer linking and for obtaining the striking increases in polymer quality which are not obtained in ordinary vulcanization but which can only be obtained by the use of the pretreatment.

EXAMPLE 2

*Effect of varying type of carbon blacks*

The thermal interaction was carried out with several different commercial carbon blacks. Table 3 shows the various compounds which were used for the experiments.

TABLE 2.—EFFECT OF SULFUR CONCENTRATION ON PHYSICAL PROPERTIES

| Parts of Sulfur per 100 parts Polymer | | 0.1 | 0.15 | 0.2 | 0.3 | 0.4 | 0.5 | 0.75 |
|---|---|---|---|---|---|---|---|---|
| Modulus at (lbs./In.²): | | | | | | | | |
| 100% | | 395 | 400 | 390 | 385 | 385 | 375 | 375 | 345 |
| 200% | | 970 | 1,200 | 1,160 | 1,175 | 1,095 | 1,075 | 1,060 | 980 |
| 300% | | 1,700 | 2,150 | 2,150 | 2,130 | 2,015 | 1,980 | 1,950 | 1,880 |
| 400% | | 2,370 | 2,925 | 2,980 | 2,925 | 2,830 | 2,770 | 2,800 | 2,680 |
| Tensile Strength, (Lbs./In.²) | | 2,525 | 2,925 | 2,980 | 3,035 | 2,900 | 2,940 | 3,030 | 2,950 |
| Percent Elongation | | 435 | 400 | 400 | 410 | 410 | 425 | 445 | 450 |
| Damping, $\eta f \times 10^{-6}$ (Poises×Cycles/Sec.) | | 4.59 | 2.71 | 2.51 | 2.43 | 2.60 | 2.81 | 2.77 | 2.87 |

TABLE 3.—COMPOUNDS WITH SEVERAL CARBON BLACKS

| Sample No. | 9 | 10 | 11 | 12 | 13 | 14 | 15 | 16 | |
|---|---|---|---|---|---|---|---|---|---|
| Isobutylene-isoprene copolymer | 100.0 | 100.0 | 100.0 | 100.0 | 100.0 | 100.0 | 100.0 | 100.0 | |
| HMF Black [1] | 50.0 | | | | | | | | |
| SRF Black [1] | | 50.0 | | | | | | | |
| EPC Black [2] | | | 50.0 | | | | | | |
| MPC Black [2] | | | | 50.0 | | | | | |
| FT Black [3] | | | | | 50.0 | | | | |
| MT Black [3] | | | | | | 50.0 | | | |
| CF Black [1] | | | | | | | 50.0 | | |
| HAF Black [1] | | | | | | | | 50.0 | |
| Stearic Acid | 0.5 | 0.5 | 0.5 | 0.5 | 0.5 | 0.5 | 0.5 | 0.5 | Portions for thermal interaction. |
| Sulfur | 0.2 | 0.2 | 0.2 | 0.2 | 0.2 | 0.2 | 0.2 | 0.2 | |
| Zinc Oxide | 5.0 | 5.0 | 5.0 | 5.0 | 5.0 | 5.0 | 5.0 | 5.0 | |
| Sulfur | 2.0 | 2.0 | 2.0 | 2.0 | 2.0 | 2.0 | 2.0 | 2.0 | Portions for curing. |
| Tetramethylthiuram disulfide | 1.0 | 1.0 | 1.0 | 1.0 | 1.0 | 1.0 | 1.0 | 1.0 | |
| 2,2'-Benzothiazyl disulfide | 1.0 | 1.0 | 1.0 | 1.0 | 1.0 | 1.0 | 1.0 | 1.0 | |

[1] Furnace black.
[2] Channel black.
[3] Thermal black.

The portions used for heat interaction were prepared using 50 parts by weight of each type of carbon black with 100 parts by weight of isobutylene-isoprene copolymer. The carbon blacks used included furnace, channel, and thermal blacks. The portions were mixed on a 6" x 12" mill. In each case, one-half of the portion was used as a control, receiving no pretreatment, while the other half was heat-mill cycled for 12 times as already described in Example 1. All data obtained on the vulcanizates of these samples are shown in Table 4.

TABLE 4.—EFFECT ON VULCANIZATES OF VARYING TYPE OF CARBON BLACK

| | H. M. F. | | S. R. F. | | E. P. C. | |
|---|---|---|---|---|---|---|
| | A | B | A | B | A | B |
| Modulus at (Lbs./In.²): | | | | | | |
| 100% | 480 | 375 | 310 | 290 | 250 | 250 |
| 200% | 1,060 | 1,075 | 675 | 800 | 575 | 850 |
| 300% | 1,550 | 1,800 | 1,010 | 1,350 | 1,075 | 1,800 |
| 400% | | | 1,320 | 1,850 | 1,640 | 2,800 |
| 500% | | | | | 2,425 | |
| 600% | | | | | | |
| 700% | | | | | | |
| Tensile Strength (Lbs./In.²) | 1,770 | 2,300 | 1,440 | 2,000 | 2,945 | 3,275 |
| Percent Elongation | 375 | 375 | 415 | 435 | 585 | 465 |
| Damping, $\eta f \times 10^{-6}$ (Poises×Cycles/Sec.) at 50° C | 3.52 | 2.42 | 1.95 | 1.42 | 3.28 | 1.74 |
| Specific Resistivity (Ohm Centimeters) | $4.43 \times 10^{7}$ | $5.45 \times 10^{7}$ | $4.07 \times 10^{7}$ | $7.51 \times 10^{14}$ | $4.36 \times 10^{7}$ | $9.33 \times 10^{14}$ |

| | M. P. C. | | F. T. | | M. T. | | C. F. | |
|---|---|---|---|---|---|---|---|---|
| | A | B | A | B | A | B | A | B |
| Modulus at (Lbs./In.²): | | | | | | | | |
| 100% | 250 | 250 | 200 | 175 | 200 | 175 | 515 | 400 |
| 200% | 525 | 775 | 340 | 400 | 375 | 425 | 990 | 1,000 |
| 300% | 950 | 1,700 | 440 | 675 | 540 | 775 | 1,400 | 1,525 |
| 400% | 1,475 | 2,700 | 560 | 950 | | | 1,700 | 2,000 |
| 500% | 2,200 | | | | | | | |
| 600% | 2,975 | | | | | | | |
| 700% | | | | | | | | |
| Tensile Strength (Lbs./In.²) | 3,225 | 3,435 | 715 | 1,230 | 625 | 950 | 1,790 | 2,210 |
| Percent Elongation | 660 | 490 | 465 | 485 | 360 | 355 | 435 | 465 |
| Damping, $\eta f \times 10^{-6}$ (Poises×Cycles/Sec.) at 50° C | 4.32 | 1.85 | 1.16 | 0.71 | 0.79 | 0.70 | 5.59 | 4.23 |
| Specific Resistivity (Ohm Centimeters) | $4.36 \times 10^{7}$ | $9.33 \times 10^{14}$ | $3.13 \times 10^{10}$ | $1.28 \times 10^{11}$ | $1.06 \times 10^{12}$ | $>10^{13}$ | $4.56 \times 10^{7}$ | $4.77 \times 10^{7}$ |

A—Controls, no pretreatment.
B—Heat-mill cycled 12 times.

Stress-strain data were obtained on the vulcanizates using standard ASTM procedure. These data are plotted in Figures II, III, IV, V and VI. These vulcanizates show increased stress after thermal treatment in the presence of sulfur. There is generally no loss in ultimate extensibility of the heat interacted composition, although a slight loss in ultimate elongation occurs with compositions containing channel blacks.

Tensile strength of the vulcanizates is increased by the addition of controlled amounts of sulfur to the copolymer-carbon black system during the heat interaction. Figure VII summarizes the tensile strength data in bar graph form. The increase in tensile strength shown by the systems containing thermal carbon blacks is particularly noteworthy. Use of the latter in isobutylene-diolefin copolymer is generally identified with high vulcanizate elasticity. Despite this property, their practical application has been greatly curtailed because of their abnormally low tensile strengths. Their uses can, therefore, be greatly increased by the improvements shown in the tensile strength.

The data shown in Figure VIII indicate the reduced damping (hysteresis) effects which result from heat treating the systems containing sulfur. This decreased damping effect is the direct result of the decreased internal viscosity of the samples.

The degree of dispersion of pigment carbon black in the polymers is generally improved by the thermal interaction with sulfur. This increased dispersion effect is shown by measurements of electrical conductivity. Poor dispersion of samples produces low electrical resistivity. The conductivity decreases as carbon particle dispersion is improved. Good dispersion gives high resistivity. In Figure IX there are shown the data observed from testing the electrical properties of the vulcanizate samples. These data indicate that improved dispersions are obtained with SRF black, FT black, and the channel carbon blacks. Little or no improvement is to be found when the high structure furnace blacks (HMF, HAF, and CF) are used. These data generally agree with work reported by Ladd and Wiegand, Rubber Age, 57, 299 (1945). There it was shown that HMF, HAF and CF carbon blacks are high structure blacks whose reticulate chain structures persist to a high degree even after milling which breaks down the structures of the other carbon blacks.

EXAMPLE 3

Static heat treatment

Comparative experiments were carried out in which the carbon black-copolymer mixtures were subjected to heat interaction using a furnace black and isobutylene-isoprene copolymer, both with and without sulfur. The details are shown in Table 5 below.

TABLE 5

| Sample No. | (Parts by weight) 17 | 18 | |
|---|---|---|---|
| Isobutylene-isoprene copolymer | 100.0 | 100.0 | Portions for thermal interaction. |
| SRF Black | 50.0 | 50.0 | |
| Stearic Acid | 0.5 | 0.5 | |
| Sulfur | | 0.2 | |
| Sulfur | 2.2 | 2.0 | Portions for Curing. |
| Tetramethylthiuram disulfide | 1.0 | 1.0 | |
| 2,2'-Benzothiazyl disulfide | 1.0 | 1.0 | |
| Zinc Oxide | 5.0 | 5.0 | |

The heat interaction portions were heated for 0, ½, 1, 2, 3, 5 hours, respectively, at 320° F. with no mechanical agitation.

Then sulfur, zinc oxide, and accelerators were added during 5 minutes on a mill at 80°–90° F. with a clearance between the rolls of 0.040" to 0.045". The final compounds were vulcanized for 45 minutes at 307° F.

Tables 6 and 7 show the very good effects obtained when mixtures of furnace carbon black and copolymer are heat interacted in the presence of limited amounts of sulfur, as compared to those without sulfur. As the heat interaction time is increased, increases in both tensile strength and modulus values are noted, as well as decreases in damping effects, when sulfur is present during pretreatment. If no sulfur is present, no such changes are observed.

EXAMPLE 4

Effect of cure time on vulcanizate properties

An experiment was carried out to study the effect of time of cure on the qualities of vulcanized product obtained both with and without sulfur present during the heat interaction. The details of the experiment are shown in Table 8 below.

TABLE 8

| Sample No. | 19 | 20 | 21 | 22 | |
|---|---|---|---|---|---|
| Isobutylene-isoprene copolymer | 100.0 | 100.0 | 100.0 | 100.0 | Portions for thermal interaction. |
| SRF Black | 50.0 | 50.0 | 50.0 | | |
| Oxidized SRF Black | | | | 50.0 | |
| Stearic Acid | 0.5 | 0.5 | 0.5 | 0.5 | |
| Sulfur | | 0.2 | | | |
| Zinc oxide | 5.0 | 5.0 | 5.0 | 5.0 | Portions for curing. |
| Sulfur | 2.0 | 2.0 | 2.0 | 2.0 | |
| Tetramethylthiuram disulfide | 1.0 | 1.0 | 1.0 | 1.0 | |
| 2,2'-Benzothiazyl disulfide | 1.0 | 1.0 | 1.0 | 1.0 | |

The portions for heat interaction were heat-mill cycled 12 times. Each cycle consisted of ½ hour heat in open steam at 320° F. followed by 5 minutes on standard mill (6" x 12", 80–90° F., 0.040"–0.045" clearance). The sulfur, zinc oxide and accelerators were added on last milling. The samples 19 and 20 were then cured 20', 30', 45', 70' at 307° F., and samples 21 and 22 were cured 10', 20', 40', 80' at 300° F.

The effects of varying the curing time are shown in the data of Tables 9 and 10 and by the curves of Figures X and XI showing stress-strain data for a number of comparative samples. Part A shows data for regular mixtures of unoxidized SRF (furnace) carbon black and isobutylene-isoprene copolymer without sulfur present. Part B shows the effect of heat treatment of the mixture in the presence of 0.2 part of sulfur/100 parts of polymer. Part C again shows the effect obtained by heat treating a mixture of the copolymer and unoxidized SRF carbon black. Part D shows the results given by the heat treatment process when the carbon black used has an oxidized surface.

TABLE 6.—CONTROL—NO SULFUR PRESENT

| | Heat Treated Samples (Control) | | | | | |
|---|---|---|---|---|---|---|
| Heating time, hours | 0 | ½ | 1 | 2 | 3 | 5 |
| Modulus at (Lbs./In.²): | | | | | | |
| 100% | 345 | 335 | 300 | 320 | 315 | 315 |
| 200% | 730 | 705 | 675 | 685 | 685 | 690 |
| 300% | 1,075 | 1,070 | 1,020 | 1,025 | 1,060 | 1,080 |
| 400% | 1,380 | 1,425 | 1,390 | 1,425 | 1,425 | 1,450 |
| Tensile Strength (Lbs./In.²) | 1,540 | 1,555 | 1,500 | 1,560 | 1,675 | 1,650 |
| Percent Elongation | 445 | 425 | 440 | 460 | 470 | 450 |
| Damping, $\eta f \times 10^{-6}$ (Poises×Cycles/Sec.), 50° C. | 2.33 | 2.51 | 2.50 | 2.54 | 2.41 | 2.35 |

TABLE 7.—SULFUR PRESENT

| | Heat Treated Samples with Sulfur | | | | | |
|---|---|---|---|---|---|---|
| Heating time, hours | 0 | ½ | 1 | 2 | 3 | 5 |
| Tensile Strength (Lbs./In.²) | 1,590 | 1,700 | 1,825 | 2,010 | 1,990 | 2,075 |
| Modulus at (Lbs./In.²): | | | | | | |
| 100% | 350 | 340 | 340 | 350 | 345 | 350 |
| 200% | 740 | 800 | 860 | 920 | 900 | 880 |
| 300% | 1,080 | 1,200 | 1,320 | 1,405 | 1,450 | 1,500 |
| 400% | 1,375 | 1,505 | 1,750 | 1,910 | 1,990 | 2,025 |
| Percent Elongation | 465 | 405 | 405 | 410 | 400 | 405 |
| Damping, $\eta f \times 10^{-6}$ (Poises×Cycles/Sec.), 50° C. | 2.37 | 2.15 | 1.95 | 1.57 | | 1.54 |

TABLE 9.—EFFECT OF VARYING CURING TIME

| | A No Sulfur, Heat Treated and Remilled | | | | B Sulfur, Heat Treated and Remilled | | | |
|---|---|---|---|---|---|---|---|---|
| Cure Time, Minutes at 307° F | 20 | 30 | 45 | 70 | 20 | 30 | 45 | 70 |
| Modulus at (Lbs./In.$^2$): | | | | | | | | |
| 100% | 260 | 275 | 300 | 325 | 210 | 250 | 280 | 300 |
| 200% | 540 | 575 | 660 | 700 | 615 | 710 | 810 | 950 |
| 300% | 850 | 900 | 1,010 | 1,050 | 1,160 | 1,330 | 1,450 | 1,550 |
| 400% | 1,175 | 1,225 | 1,300 | | 1,725 | 1,860 | 2,000 | 2,060 |
| 500% | 1,525 | 1,500 | | | 2,215 | | | |
| Tensile Strength (Lbs./In.$^2$) | 1,850 | 1,625 | 1,375 | 1,340 | 2,395 | 2,415 | 2,250 | 2,060 |
| Percent Elongation | 560 | 510 | 420 | 390 | 560 | 495 | 445 | 400 |

TABLE 10.—EFFECT OF VARYING CURE TIME

| | C S.R.F. Carbon, Heat Treated and Remilled | | | | D Oxidized S.R.F. Carbon, Heat Treated and Remilled | | | |
|---|---|---|---|---|---|---|---|---|
| Cured, Minutes at 300° F | 10 | 20 | 40 | 80 | 10 | 20 | 40 | 80 |
| Modulus at (Lbs./In.$^2$): | | | | | | | | |
| 100% | 135 | 210 | 255 | 290 | 155 | 185 | 200 | 245 |
| 200% | 280 | 395 | 530 | 705 | 425 | 450 | 645 | 710 |
| 300% | 485 | 705 | 1,000 | 1,095 | 910 | 1,105 | 1,355 | 1,505 |
| 400% | 755 | 1,130 | 1,390 | 1,495 | 1,585 | 1,795 | 2,095 | 2,195 |
| 500% | 1,145 | 1,550 | 1,800 | | 2,215 | | 2,590 | |
| Tensile Strength (Lbs./In.$^2$) | 2,410 | 2,380 | 1,860 | 1,665 | 2,765 | 2,610 | 2,590 | 2,335 |
| Percent Elongation | 770 | 670 | 510 | 430 | 610 | 550 | 500 | 430 |

EXAMPLE 5

*Effect of carbon black on thermal interaction*

This experiment is presented to show the effect of the presence of the carbon black. These data show that the heat interaction effects obtained with the copolymer and sulfur requires the presence of the carbon black in order to be effective. The details of the experiment are shown below in Table 11.

TABLE 11

| Sample No. | 27 | 28 | 29 | |
|---|---|---|---|---|
| Isobutylene-Isoprene copolymer | 100.0 | 100.0 | 100.0 | Portions for thermal interaction. |
| SRF Black | | | 50.0 | |
| Stearic Acid | 0.5 | 0.5 | 0.5 | |
| Sulfur | | 0.2 | 0.2 | |
| Zinc Oxide | 5.0 | 5.0 | 5.0 | Portions for curing. |
| Sulfur | 2.0 | 2.0 | 2.0 | |
| Tetramethylthiuram disulfide | 1.0 | 1.0 | 1.0 | |
| 2,2'-Benzothiazyl disulfide | 1.0 | 1.0 | 1.0 | |

The portions designated for thermal interaction were heat-mill cycled for 12 times in the same manner as described above in Example 4. The samples were cured for 45 minutes at 307° F.

The effects of thermal treatments of polymer alone, polymer and sulfur, and polymer, sulfur and carbon black are shown in Table 12 and in the curves of Figure XII in which stress-strain data are plotted. These curves show that the carbon black forms a necessary part of the heat interaction process.

TABLE 12.—EFFECT OF CARBON BLACK

| Sample No. | Heated-Treated and Remilled | | |
|---|---|---|---|
| | 27 | 28 | 29 |
| Modulus at (Lbs./In.$^2$): | | | |
| 100% | 330 | 325 | 345 |
| 200% | 670 | 700 | 950 |
| 300% | 985 | 1,060 | 1,550 |
| 400% | 1,270 | 1,350 | 2,100 |
| Tensile Strength (Lbs./In.$^2$) | 1,380 | 1,550 | 2,200 |
| Percent Elongation | 440 | 480 | 430 |
| Damping, $n f \times 10^{-6}$ (Poises × Cycles/Sec.), 50° C | 2.37 | 2.00 | 1.56 |

Sample No. 27—polymer alone.
Sample No. 28—polymer and sulfur.
Sample No. 29—polymer, sulfur and black.

The data obtained on the damping effects also indicate that carbon black is necessary in order to achieve maximum results with the heat interaction method.

EXAMPLE 6

*Heat treatment in the Banbury mixer*

The following masterbatches shown in Table 13 below were prepared under "cool" conditions in the Banbury mixer using a batch factor of 17.

TABLE 13

| Sample No. | 30 | 31 | 32 | 33 | 34 | |
|---|---|---|---|---|---|---|
| Isobutylene-Isoprene copolymer | 100.0 | 100.0 | 100.0 | 100.0 | 100.0 | Portions for thermal interaction. |
| MPC Carbon Black | 50.0 | 50.0 | 50.0 | 50.0 | 50.0 | |
| Stearic Acid | 0.5 | 0.5 | 0.5 | 0.5 | 0.5 | |
| Sulfur | | 0.05 | 0.1 | 0.3 | 0.5 | |
| Zinc Oxide | 5.0 | 5.0 | 5.0 | 5.0 | 5.0 | Portions for Curing. |
| Sulfur | 2.0 | 2.0 | 2.0 | 2.0 | 2.0 | |
| Tetramethylthiuram disulfide | 1.0 | 1.0 | 1.0 | 1.0 | 1.0 | |
| 2,2'-Benzothiazyl disulfide | 1.0 | 1.0 | 1.0 | 1.0 | 1.0 | |

Full cooling water was employed in the Banbury for these operations. The polymer was run for 2 minutes and then ½ of the black charge was added. The final charge of black and the sulfur and stearic acid were added 2 minutes after the first charge of black. Dump temperatures were all in the neighborhood of 140° C.

For carrying out the thermal interaction, full steam was supplied to the Banbury and each of the batches was agitated for 30 minutes during which time the temperature reached about 390° F.

Each of the masterbatches, both before (series A) and after the Banbury heat treatment (series B), was compounded according to the formulation shown in Table 8. The addition of the curatives was accomplished in each case on a 6" x 12" mill regulated at 80-90° F. and with a roll clearance of 0.040"-0.045". Five minutes were consumed by the operation. The compounds were then vulcanized for 20 minutes at 307° F.

The data which were obtained from testing these vulcanizates are shown in Table 14. It can be seen from this table that the presence of sulfur during the hot Banbury treatment brings about highly desirable changes in the properties of the copolymer. Moduli are higher and internal viscosities lower when sulfur is employed. As the dose of sulfur goes up to 0.3% and higher the vulcanization reaction is completed and then broken down in the Banbury treatment with the result that a reclaimed product is obtained. The physical properties are poor as in all reclaimed materials.

TABLE 14

| Run No. | 30A | 31A | 32A | 33A | 34A | |
|---|---|---|---|---|---|---|
| Parts of Sulfur/100 parts of Polymer | 0.0 | 0.05 | 0.1 | 0.3 | 0.5 | |
| Modulus at (Lbs./In.$^2$): | | | | | | |
| 100% | 250 | 280 | 275 | 275 | 275 | |
| 200% | 475 | 520 | 570 | 560 | 605 | |
| 300% | 855 | 940 | 1,000 | 995 | 1,070 | Prepared |
| 400% | 1,330 | 1,485 | 1,570 | 1,530 | 1,645 | without |
| 500% | 1,930 | 2,125 | 2,200 | 2,150 | 2,295 | heat |
| 600% | 2,570 | 2,745 | 2,855 | 2,805 | 2,960 | treatment. |
| Tensile Strength (Lbs./In.$^2$) | 3,135 | 3,155 | 3,235 | 3,225 | 3,225 | |
| Percent Elongation | 695 | 675 | 680 | 685 | 650 | |
| Damping, $\eta f \times 10^{-6}$ (Poises × Cycles/Sec.), 50° C | 4.42 | 3.86 | 3.38 | 4.25 | 4.77 | |

| Run No. | 30B | 31B | 32B | 33B | 34B | |
|---|---|---|---|---|---|---|
| Parts of Sulfur/100 parts of polymer | 0.0 | 0.05 | 0.1 | 0.3 | 0.5 | |
| Modulus at (Lbs./In.$^2$): | | | | | | |
| 100% | 260 | 270 | 270 | 250 | 225 | |
| 200% | 595 | 680 | 645 | 595 | 540 | |
| 300% | 1,185 | 1,345 | 1,260 | 1,210 | 1,160 | Prepared |
| 400% | 1,870 | 2,075 | 2,075 | 1,855 | 1,755 | with hot |
| 500% | 2,500 | 2,730 | 2,710 | 2,380 | 2,255 | Banbury |
| 600% | 3,000 | | | | | treatment. |
| Tensile Strength (Lbs./In.$^2$) | 3,055 | 2,995 | 2,770 | 2,630 | 2,540 | |
| Percent Elongation | 610 | 545 | 525 | 550 | 585 | |
| Damping, $\eta f \times 10^{-6}$ (Poises × Cycles/Sec.), 50° C | 3.21 | 2.30 | 2.26 | 2.43 | 2.90 | |

An experiment was carried out in which a batch of copolymer containing 2 parts of sulfur per 100 parts of polymer was heat treated in a Banbury mixer. The properties of the vulcanizate are shown below in Table 15.

TABLE 15

Modulus at 100% (lbs./in.$^2$) _____ 125
Modulus at 200% (lbs./in.$^2$) _____ 225
Modulus at 300% (lbs./in.$^2$) _____ 475
Modulus at 400% (lbs./in.$^2$) _____ 840
Modulus at 500% (lbs./in.$^2$) _____ 1225
Modulus at 600% (lbs./in.$^2$) _____ 1610
Tensile strength (lbs./in.$^2$) _____ 1875
Percent elongation _____ 670
$\eta f$, (poise×C. P. S.×$10^{-6}$) at 50° C _____ 5.23

In this case in which too great an amount of sulfur was employed, the moduli and tensile values are even lower than when no heat treatment is employed and that the internal viscosity is higher.

EXAMPLE 7

Use of sulfur-containing materials

Both organic sulfur-containing materials such as Tuads (tetramethylthiuram disulfide), Captax (mercaptobenzothiazole), Altax (2,2'-benzothiazyl disulfide) and Zimate (zinc salts of Tuads) and inorganic materials such as phosphorus and antimony pentasulfides and the like, also gave improvements of the type which is obtained with elemental sulfur, when they were employed with the heat interaction technique.

EXAMPLE 8

Heat interaction with selenium and tellurium

In experiments comparable to those employing sulfur, selenium and tellurium were also shown to give similar improvements in isoolefin-diolefin copolymers.

Table 16 shows the compounds which were used in this work. The concentration of selenium and tellurium was taken on a molar basis with sulfur set at 0.2 part (per 100 parts of polymer). Polymer, pigment, and stearic acid were mixed together in a masterbatch and sulfur, selenium, and tellurium respectively were added to portions (602.0 gms.) of the masterbatch. Half of each portion was taken as a control with no thermal treatment prior to the addition of curatives. The remaining half portions were heat-mill cycled 12 times. The procedure already described was used for this operation and for preparing the final vulcanizates.

TABLE 16.—COMPOUNDS WITH SELENIUM AND TELLURIUM

| Sample No. | 35 | 36 | 37 | |
|---|---|---|---|---|
| Isobutylene-isoprene copolymer | 100.0 | 100.0 | 100.0 | |
| SRF Black | 50.0 | 50.0 | 50.0 | Portions for |
| Stearic Acid | 0.5 | 0.5 | 0.5 | thermal interaction. |
| Sulfur | 0.2 | | | |
| Selenium | | 0.8 | | |
| Tellurium | | | 0.5 | |
| Zinc Oxide | 5.0 | 5.0 | 5.0 | |
| Sulfur | 2.0 | 2.0 | 2.0 | Portions for |
| Tetramethylthiuram disulfide | 1.0 | 1.0 | 1.0 | Curing. |
| 2,2'-Benzothiazyl disulfide | 1.0 | 1.0 | 1.0 | |

Similar improvement in stress-strain properties which results from thermal interaction with sulfur is obtained with selenium and with tellurium. The degree of improvement varies, greater effects being shown with selenium than with tellurium.

Measurements of vulcanizate damping yield results which show improvements similar to those shown by the presence of sulfur.

What is claimed is:

1. A process which comprises mixing carbon black with a low unsaturation solid olefin-multiolefin synthetic rubbery copolymer, said olefin and multiolefin having from 4 to 14 carbon atoms, and a small but non-vulcanizing amount up to 1% of a reactant selected from the group consisting of the elements sulfur, selenium, tellurium and reactive compounds containing said elements and capable of yielding them at temperatures above 250° F., and subjecting said mixture to an elevated temperature above about 250° F. up to about 450° F., inversely for an extended period of time of about 7 hours to 10 minutes, in the absence of accelerators capable of effecting substantial vulcanization of the copolymer, the combination of said heating temperature and time being insufficient to cause any substantial vulcanization of said copolymer, but being sufficient to produce a heat-interaction involving said copolymer, said carbon black and said sulfur material, whereby both the stress properties and the elastic properties of the subsequently cured copolymer are improved.

2. A process which comprises mixing about 20 to 200 parts by weight of carbon black with 100 parts by weight of a vulcanizable low unsaturation isobutylene-diolefin synthetic rubbery copolymer having an iodine number below 50, and with a non-vulcanizating amount of about 0.05–0.5% based on the copolymer of a sulfur-type element selected from the group consisting of sulfur, selenium and tellurium, and subjecting said mixture to an elevated temperature of about 250–450° F. inversely for an extended period of time of about 7 hours to 10 minutes, in the absence of accelerators capable of effecting substantial vulcanization of the copolymer, the combination of said heating temperature and time being insufficient to cause any substantial vulcanization of said copolymer, but being sufficient to produce a heat-interaction involving said copolymer, said carbon black and said sulfur material, whereby both the stress properties and the elastic properties of the subsequently cured copolymer are improved.

3. A process which comprises mixing about 20 to 200 parts by weight of carbon black with 100 parts by weight of a rubbery isobutylene-isoprene copolymer having an iodine number of about 1 to 50 and a Staudinger molecular weight of about 20,000 to 200,000, and with a non-vulcanizing amount of about 0.05–0.2% based on the copolymer of sulfur, and heating said mixture to about 250–450° F. inversely for about 7 hours to 10 minutes, in the absence of accelerators capable of effecting substantial vulcanization of the copolymer, the combination of said heating temperature and time being insufficient to cause any substantial vulcanization of said copolymer but being sufficient to produce a heat-interaction involving said copolymer, said carbon black and said sulfur, and subsequently mixing the resultant plastic heat-interacted but uncured polymer product with curing amounts of curing agents, and then shaping and curing the composition, whereby there is produced a cured composition having superior stress and elastic properties compared to similar cured compositions which had not been thus heat-interacted with sulfur.

4. Process according to claim 3 in which the non-vulcanizing heat-interaction is effected by hot milling at about 380–440° F. for about 60 to 10 minutes.

5. A process which comprises mixing about 50 parts by weight of carbon black with 100 parts by weight of a rubbery synthetic copolymer of about 95 to 99.5% isobutylene and about 5 to 0.5% of isoprene, and a Staudinger molecular weight of about 20,000 to 200,000, and with a non-vulcanizing amount of about 0.05 to 0.2% based on the copolymer of sulfur and hot milling the resulting mixture at about 380–400° F. for about 30 minutes in the absence of vulcanization accelerators, to effect a non-vulcanizing heat-interaction involving said copolymer, said carbon black and said sulfur, and subsequently cooling and mixing the resultant plastic heat-interacted but uncured copolymer product with about 2 parts by weight of sulfur and about 2 parts by weight of vulcanization accelerators selected from the group consisting of tetramethylthiuram disulfide, mercaptobenzothiazole and benzothiazyl disulfide, and finally shaping and curing the composition.

6. Process according to claim 3 in which the non-vulcanizing heat-interaction is effected by 2 to 12 alternate cycles of 2 to 10 minutes milling and then heating 15 to 60 minutes without working.

7. Process according to claim 3 in which the non-vulcanizing heat-interaction is effected by heating to about 250–450° F. inversely for about 7 hours to 30 minutes without agitation.

8. Process according to claim 1 in which the multiolefin is butadiene.

9. A composition of matter comprising a non-vulcanized heat-interaction product of about 20 to 200 parts by weight of carbon black, about 100 parts by weight of a vulcanizable low unsaturation solid olefin-multiolefin synthetic rubbery copolymer of an olefin and a multiolefin having from 4 to 14 carbon atoms, and a non-vulcanizing amount of about 0.05–1.0% based on the copolymer of a reactant selected from the group consisting of the elements sulfur, selenium and tellurium and reactive compounds containing said elements and capable of yielding them at temperatures above 250° F., said heat-interaction product containing non-reversibly bound copolymer through bonds formed between the copolymer and carbon black by the said sulfur-type reactant, and said heat-interaction product having been derived by heating a homogeneous mixture of said materials at about 250–450° F. inversely for an extended period of time of about 7 hours to 10 minutes in the absence of vulcanization accelerators.

10. A vulcanized composition of matter derived by shaping and curing with curing amounts of curing agents, a plastic non-vulcanized homogeneous heat-interaction product of about 20 to 200 parts by weight of carbon black with 100 parts by weight of a vulcanizable rubbery copolymer of isobutylene and a diolefin having from 4 to 8 carbon atoms, said copolymer having an iodine number of about 1 to 50, and a Staudinger molecular weight of about 20,000 to 200,000, and a non-vulcanizing amount of about 0.05 to 0.5% based on the copolymer of a sulfur-type reactant selected from the group consisting of sulfur, selenium and tellurium and reactive compounds containing said elements and capable of yielding them at temperatures about 250° F., said unvulcanized heat-interaction product containing irreversibly bound copolymer heat-interacted with carbon black through bonds formed with said sulfur-type reactant, and said heat-interaction production being derived by a non-vulcanizing heat-interaction at about 250° F.–450° F. inversely for about 7 hours to 10 minutes in the absence of vulcanization accelerators.

11. A vulcanized composition of matter derived by curing with about 2 parts by weight of sulfur and about 2 parts by weight of vulcanization accelerators selected from the group consisting of tetramethylthiuram disulfide, mercaptobenzothiazole and benzothiazyl disulfide, a plastic non-vulcanized heat-interaction product of about 20 to 200 parts by weight of carbon black, about 100 parts by weight of a rubbery copolymer of about 95 to 99.5% by weight of isobutylene and about 5 to 0.5% by weight of isoprene, said copolymer having a Staudinger molecular weight of about 20,000 to 200,000, and about 0.05 to 0.2% based on said copolymer of sulfur, said heat-interaction product having been heat-interacted by hot milling said materials at 380–450° F. for about 60 to 10 minutes in the absence of vulcanization accelerators, said vulcanized composition having a 300% modulus of about 1880–2150 lbs. per square inch, and having a damping value, substantially as described, of about 2.43 to 2.87.

12. The method which comprises masticating in a Banbury mixer a uniform mixture of 100 parts of an isobutylene-multi-olefinic unsaturate rubbery copolymer, at least 35 parts of rubber-reinforcing carbon black selected from the group consisting of channel black and oil furnace black and not over 1.0 part of tetramethyl thiuram disulfide at a temperature of at least 300° F. for at least 10 minutes but not over 30 minutes, cooling the mixture, incorporating vulcanizing ingredients therewith, shaping the mixture, and vulcanizing the shaped mixture.

13. The method which comprises masticating in a Banbury mixer a uniform mixture of 100 parts of an isobutylene-multi-olefinic unsaturate rubbery copolymer, at least 35 parts of rubber-reinforcing carbon black selected from the group consisting of channel black and oil furnace black, and not over 1 part of sulfur at a temperature of at least 350° F. for at least 10 minutes but not over 30 minutes, so limiting said masticating as to avoid thermal degradation, cooling the mixture, incorporating vulcanizing ingredients therewith, shaping the mixture and vulcanizing the shaped mixture.

References Cited in the file of this patent

UNITED STATES PATENTS

| | | |
|---|---|---|
| 2,356,955 | Thomas et al. | Aug. 29, 1944 |
| 2,392,847 | Frolich | Jan. 15, 1946 |
| 2,471,866 | Eby | May 31, 1949 |
| 2,494,766 | Lightbown et al. | Jan. 17, 1950 |
| 2,526,504 | Rehner et al. | Oct. 17, 1950 |

OTHER REFERENCES

Baldwin et al.: Ind. Eng. Chem., September 1944, pages 791–795.